(12) United States Patent
Frank (10) Patent No.: US 7,457,590 B2
(45) Date of Patent: Nov. 25, 2008

(54) METHOD, APPARATUS AND SYSTEM FOR USE IN THE TRANSMISSION OF WIRELESS COMMUNICATIONS USING MULTIPLE ANTENNAS

(75) Inventor: Colin Frank, Chicago, IL (US)

(73) Assignee: Motorola, Inc., Schaumburg, IL (US)

( * ) Notice: Subject to any disclaimer, the term of this patent is extended or adjusted under 35 U.S.C. 154(b) by 585 days.

(21) Appl. No.: 10/744,487

(22) Filed: Dec. 23, 2003

(65) Prior Publication Data
US 2005/0136841 A1 Jun. 23, 2005

(51) Int. Cl.
*H04B 7/00* (2006.01)
*H04B 1/00* (2006.01)

(52) U.S. Cl. .................. 455/69; 455/561; 455/562.1; 455/67.11

(58) Field of Classification Search .......... 455/561, 455/562.1, 101, 67.11, 69
See application file for complete search history.

(56) References Cited

U.S. PATENT DOCUMENTS 6,453,177 B1 9/2002 Wong et al.
6,754,473 B1* 6/2004 Choi et al. ............... 455/101
2004/0014501 A1* 1/2004 Kuwahara et al. ........ 455/561

OTHER PUBLICATIONS

C.D. Frank, MMSE Reception of DS-CDMA with Open-Loop Transmit Diversity, Mar. 2001, 3G Mobile Communication Technologies, 26-28.*

* cited by examiner

*Primary Examiner*—Yuwen Pan (57) ABSTRACT

A method, apparatus and system are provided for use in optimizing signal-to-noise ratios at remote wireless devices. A method can receive a signal over a reverse link, determine an angular power profile of the reverse link signal, and determine an antenna weighting vector for the forward traffic signal based on the angular power profile. The determination of the weighting vector can include retrieving the vector from a weighting vector table. Some methods identify boundaries of angular spreads and utilize pre-calculate weighting vectors according to the boundaries. An apparatus can include an antenna array, a wireless receiver that receives reverse link signals, a detector that detects an angular power profile of the signals, a controller that determines a weighting vector and applies the weighting vector to the antenna array when transmitting. Some embodiments are dependent on whether the forward link incorporates a common pilot or per-user pilot signal.

12 Claims, 5 Drawing Sheets

METHOD, APPARATUS AND SYSTEM FOR USE IN THE TRANSMISSION OF WIRELESS COMMUNICATIONS USING MULTIPLE ANTENNAS

FIELD OF THE INVENTION

The present invention relates generally to wireless communications, and more particularly to using multiple antennas to better optimize the transmission of wireless communications within a wireless network.

BACKGROUND OF THE INVENTION

Wireless communication systems are attempting to reduce noise and interference among wireless devices and base stations by narrowing the width of the wireless communication beams. These systems further attempt to direct or steer these narrow beams at predefined regions or at intended mobile devices. The narrower beam interferes with fewer non-intended mobile devices or other sensitive devices. This additionally can allow the beam to be transmitted at reduced power levels because the beam covers a smaller area. A reduction in the transmitted power can also reduce the average interference at non-intended devices.

Some wireless communications systems require detailed channel information to determine and maximize a signal-to-noise ratio at intended mobile devices. For a time-division duplex (TDD) system, reciprocity can be assumed between the propagation channels on the forwards and reverse link so that the detailed channel information is available at the transmitter. However, for frequency-division duplex systems (FDD), reciprocity does not apply between the forward and reverse links, and thus detailed channel information is not available unless channel measurements are taken at the receiver and fed back to the transmitter. Additionally, many existing systems utilize common pilot signals to demodulate the received traffic signals. In these systems, the mobile estimates the channel gain and phase using the common pilot signal, makes the assumption that the channel for the common pilot signal is the same as for the traffic channel, and uses the gain and phase estimate from the common pilot channel to demodulate the traffic channel signals. These assumptions cannot be utilized when a system uses separate beams for the common pilot signal and for each traffic user. The accurate implementation of narrower beams appears to offer potentially significant benefits. However, problems with previous systems potentially prevent and/or potentially inhibit the implementation of beam narrowing. Additionally, the explicit and detailed channel information required by previous systems will reduce reverse link capacity if fed back from the receiver, while the circuitry and significant signal processing capabilities to calculate the beams can be expensive to implement. These costs and added complexity may possibly serve to delay or deter implementation of narrowed beam systems.

BRIEF DESCRIPTION OF THE DRAWINGS

The above needs are at least partially met through provision of the method, apparatus, and system for using multiple antennas to better optimize the transmit beam in a wireless communication system described in the following detailed description, particularly when studied in conjunction with the drawings, wherein.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are typically not depicted in order to facilitate a less obstructed view of these various embodiments of the present invention.

DETAILED DESCRIPTION

These various embodiments provide for methods, systems and equipment or apparatuses that can be used to maximize system capacity, minimize transmit power requirements and/or maximize a received signal-to-noise ratio (SNR) and particularly so when used in conjunction with narrowed and/or steered beam transmissions. The present embodiments provide for the optimization of wireless beam synthesis by attempting to optimize and/or maximize the SNR that would be seen at the mobile. These embodiments utilize angular power profiles measured from reverse link signals to determine and generate a complex weighting that can be applied to an antenna array. The weighting on the antenna array provides for the implementation of beam narrowing and/or steering of transmitted signals and further allows for a reduced transmit power while still achieving a target SNR at the mobile. The reduced transmit power and narrowed beams further enhance the capacity of a wireless communication system because the transmit beams have been better optimized separately for an intended mobile or group of mobiles.

These embodiments determine an antenna weighting based, at least in part, on an angular power profile of a wireless communication received over a reverse link, and the antenna weighting is typically determined without the need for channel phase information. A simplified algorithm is provided that utilizes only minimal amounts of data to compute and/or determine an enhanced antenna weighting. Some embodiments utilize one or more look-up tables in determining antenna weighting, which reduce computational requirements while allowing quick and accurate determination of an antenna weighting.

In some embodiments, methods are provided for use in optimizing a signal-to-noise ratio (SNR) at a wireless device receiving wireless communication. These methods can include receiving a reverse link signal over a wireless reverse link channel from the wireless device, determining an angular power profile of the reverse link signal, and determining an antenna weighting vector for a forward traffic signal based on the angular power profile of the reverse link signal. The determination of the antenna weighting vector can include accessing an antenna weighting vector table and retrieving the antenna weighting vector that is associated with the determined angular power profile.

In some embodiments, apparatuses are provided that can increase capacity over a wireless communication network. Some of these apparatuses can include an antenna array that at least transmits traffic signals, a wireless receiver that receives a reverse link signal, a detector coupled with the wireless receiver (wherein the detector detects or estimates an angular power profile of the reverse link signal), and a controller coupled with the detector and the antenna array, wherein the controller directs the determination of a weighting vector and the controller directs the weighting vector to be applied to the antenna array when transmitting the traffic signal. The memory of these apparatuses can additionally include a weighting vector table coupled with the controller, wherein the controller selects the weighting vector from the weighting vector table that is associated with the angular power profile.

Some embodiments provide methods for use in beam generation for wireless communication. These methods use knowledge of a measured array response as a function of the antenna azimuth to compute a square first matrix R, of dimension equal to a number of antenna elements, with elements computed by integration of the outer product of the array response vector a($\theta$) with itself over the range of azimuth (0, $2\pi$). The first R matrix is factored to produce a second square Q matrix, which is the square root of R. A third square matrix $R_f$ is computed by integration, over the range of azimuth from (0,$2\pi$), of the outer product of the array response vector a($\theta$) with itself against an estimate of the reverse link angular power profile, f ($\theta$), for the mobile of interest. The antenna weighting vector can be computed from the factored Q matrix and the third matrix, $R_f$. Some of these methods can further apply the antenna weighting vector to an antenna array and generate a forward link signal through the antenna array with the antenna weighting vector applied. Additionally, some embodiments that utilize a common pilot can determine the antenna weighting vector as the product of the inverse of the first R, the third matrix $R_f$ and a transmit weighting vector p used to generate the common pilot. Some embodiments that utilize a dedicated pilot signal or signals determine the antenna weighting vector as the product of the inverse of a Hermitian of the Q matrix and a largest eigenvalue of a matrix determined as the product of the inverse of the Hermitian Q matrix, the third matrix $R_f$ and the inverse of the Q matrix. These embodiments provide for better optimized beam synthesis, in the sense of optimizing and/or maximizing the SNR measured at the mobile, for arbitrary angular power profiles. This more optimized beam synthesis can be applied for both common and dedicated pilot systems. A complex weighting is determined that can be applied to an antenna array to minimize the transmit power needed to achieve a given target SNR and/or signal-to-interference ratio (SIR) at the mobile. Similarly, for a given transmit power, these embodiments utilize an antenna weighting to better maximize the SNR and/or SIR at the mobile. Some embodiments further improve the capacity of a wireless communication system by using transmit beams that have been better optimized separately for each mobile or group of mobiles, relatively maximizing the transmit power for achieving a given SNR and/or SIR at the mobile.

Narrowed and steered beams are being implemented in cellular and other wireless communication industries in attempts to increase capacity and signal quality. For example, cellular communication networks communicating with code division multiple access (CDMA), wideband code division multiple access (WCDMA) and other wireless systems are implementing steered beams that are focused at a narrower region and/or mobile device. On a forward link, with data communicated wirelessly from a base station or base transceiver station (BTS) to a mobile device, the use of narrowed wireless communication beams reduce the amount of power used to achieve a given SNR at the mobile by focusing the transmitted power more narrowly than is typical for a sector antenna in the direction of the mobile. In CDMA system and in many other wireless communication systems, any reduction in the transmitted power reduces the average interference observed by other mobiles in proportion with the average reduction in transmitted power, and increases system capacity in proportion with the inverse of the reduction in transmit power.

The present embodiments define the SNR at the mobile receiver as a function of both the transmit beam and the propagation channel between the BTS and the mobile as a function of angle from the BTS. A transmit weighting vector w is further provided that relatively maximizes and/or optimizes the SNR at the mobile receiver. The SNR definition and the transmit weighting vector that better optimizes the SNR can be provided for both common pilot systems and dedicated (per-user) pilot systems.

In some embodiments, the improved transmit beam is defined according to an angular power profile between the mobile and the BTS. On a forward or down-link, the angular power profile defines a gain between the BTS and the mobile as a function of a transmit angle theta $\theta$. On a reverse or up-link, the angular power profile defines the gain between the mobile and the BTS as a function of the receive angle theta $\theta$. In a frequency division duplex (FDD) system, the forward and reverse link angular power profiles are typically not equal in an instantaneous sense. However, due to reciprocity, the forward and reverse link angular power profiles are substantially equal in a long-term average sense (e.g., 0.25 seconds, 0.5 seconds, 1.0 seconds, or other periods of time providing an accurate average over the relevant channel fading process or processes).

In the generation of narrowed and/or steered beams that provide the desired SNR, these embodiments typically assume multi-path signals arriving at different angles correspond to delays separated by one or more chips. Under this assumption, the signals do not add coherently in the channel, and as a result propagation phase is not needed to better optimize the transmit beam. Thus, the present embodiments optimize the SNR by using channel gain or amplitude information, without knowledge of the channel phase. This lack of dependence of the generation of the transmit beam on the phase of the reverse link propagation channel is advantageous because the instantaneous phases of the forward and reverse link channels are generally considered to be uncorrelated in many systems, such as FDD systems. However, in some embodiments, phase can additionally be utilized to provide some verification and/or alternate methods for determining the resulting antenna weighting vector, such as those utilized in prior art systems.

The transmit beams are better optimized by in part minimizing the transmit power needed to achieved a particular SNR measure at the mobile, for both common and dedicated pilots. In the generation of antenna weighting vectors for the transmit beams, some common pilot embodiments utilize the known sector pilot antenna weighting vector and a measured angular power profile to provide an antenna weighting vector for the mobile of interest. Typically, the measured angular power profile is for the mobile of interest where the angular power is based on an average power as a function of angle of arrival.

Some embodiments utilize the known parameters and the measured parameters to calculate antenna weighting vectors that are applied to the antenna array in real time. The computational processing needed in calculating the weighting vectors in real time may be time costly and difficult to implement. As such, in some alternative embodiments, pre-calculated antenna weighting coefficients can be pre-stored and easily accessible for a set of transmit beams with a sufficient range and granularity in direction and width to provide coverage, in a nearly optimal manner, of the angular power profiles that may reasonably be encountered. The implementation and use of the pre-stored antenna weighting coefficients reduces the required amount of real-time computational processing. With this approach, the angular power profiles are mapped to a set of pre-defined angular power profiles for which better optimized beams have been pre-computed. For example, beams may be pre-calculated for a set of angular power profiles in which the received angular power is unity (=1) over some contiguous angular interval, such as for azimuths greater than a and less than b, where b is greater than a (e.g., the region (a, b)), and is zero ($\theta$) outside of this interval. The set of angular intervals (a, b) for which the gain is unity can be varied in width and direction in regular increments (e.g., every one or two degrees) so as to cover the range of channels that may be encountered with sufficient fidelity. The measured angular power profile for a particular mobile is mapped to the best pre-defined channel for that angular power profile and the corresponding pre-defined beam for that profile is selected. In this arrangement, the selected beam may correspond to the narrowest interval (c, d) that covers the angular power profile of the selected mobile.

Figure 1:
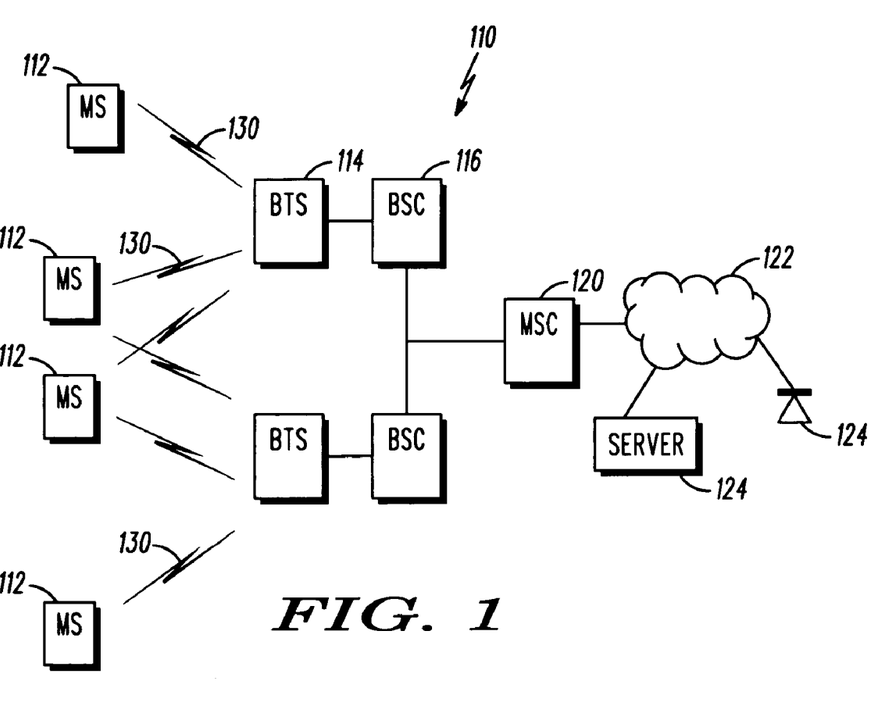
FIG. 1 depicts a simplified block diagram of a wireless communication network that provides wireless communications according to some embodiments.

FIG. 1 depicts a simplified block diagram of a wireless communication network 110, such as an FDD network, that provides wireless communications according to some embodiments. The wireless communications can be achieved utilizing code division multiple access (CDMA) such as, IS-95A, IS-95B, CDMA2000, described in CDMA2000 International Telecommunication Union-Radiocommunication (ITU-R) Radio Transmission Technology (RTT) Candidate Submission document, which is incorporated herein by reference, CDMA1X, CDMA1XEV-DO and the like. However, in alternative embodiments the communication network 110 may utilize other digital cellular communication protocols such as, but not limited to, previous generations of CDMA, Cellular System Remote unit-Base Station Compatibility Standard of the Electronic Industry Association/Telecommunications Industry Association Interim Standard 2000 (IS2000), the next generation CDMA architectures, for example those described in the UMTS Wideband CDMA SMG2 UMTS Physical Layer Expert Group Tdoc SMG2 UMTS-L1 221/98 (UMTS 221/98), WCDMA, FDMA, the next generation Global System for Mobile Communications (GSM), the CDMA system as described in "Personal Station-Base Station Compatibility Requirements for 1.8 to 2.0 GHz Code Division Multiple Access (CDMA) Personal Communication System" (American National Standards Institute (ANSI J-STD-008)), or the European Telecommunications Standards Institute (ETSI) Wideband CDMA (W-CDMA), or other similar protocols.

Still referring to FIG. 1, the network 110 provides voice and/or data to be wirelessly communicated to and/or from one or more wireless devices 112 (e.g., mobile phones, wireless computers, personal digital assistants, data or messaging devices, multi-media players, televisions, set-top-boxes, and the like). The network typically includes one or more base stations or base transceiver stations (BTS) 114 that include wireless transceivers for wirelessly communicating with the wireless devices 112. The wireless devices and BTSs provide for the coding, decoding, error checking and correction, frame type determination, power control, wireless transmission and reception and other similar functions as is otherwise generally understood in the art.

The BTSs 114 typically couple with one or more base station controllers (BSC) 116 that can include selector distributor units and/or mobile switching centers (MSC) 120. The MSCs can couple with a communication network 122, such as a public switched telephone network, an integrated services digital network, the Internet, other MSCs, other networks and other components of the communication system 110. The communication network 122 can further couple with other networks.

The optimizing of the transmit signals can be implemented within the BTSs 114, BSCs 116, the MSCs 120, the wireless devices 112 and/or other components within the network. Such functionality is probably best implemented with or in software programs and instructions and/or hardware (e.g., integrated circuits, application specific integrated circuits (ASIC) and the like), such as ASICs implemented in one or more of the wireless devices, BTSs, BSCs, MSCs or other devices of the system. Based on the present disclosure, one skilled in the art will be readily capable of producing and implementing such software and/or hardware without undo experimentation.

The wireless devices 112 can communicate with other wireless devices within the network 110, other wireless device in other wireless systems (not shown), and other hard wired devices 124 (e.g., telephones, servers, computers, and the like). Typically, each wireless device communicates over a wireless link or channel 130. Further, wireless devices can in some instances simultaneously communicate with a plurality of BTSs. Communicating with a plurality of BTSs allows the system to take advantage of handoffs between BTSs to better optimize the wireless signal quality and/or coverage for the network 110.

In some embodiments, the communication between the base station 114 and a mobile 112 is achieved through an FDD system where forward link transmission from the base station 114 to the mobile 112 is at one frequency and the reverse link transmission from the mobile to the base station is at a different frequency. The forward and reverse link channels are correlated over a length of time, but not in an instantaneous or short term sense. As a result, channels for the forward link from the BTS to the mobile are not assumed to be the same as the reverse link channels from the mobile to the BTS in an instantaneous sense. The forward and reverse link channels are statistically related in a long-term average sense, but will not be the same instantaneously because of the different frequencies at which the two signals operate.

The present embodiments utilize a determined relationship between the forward and reverse links, where the relationship does provide that some of the characteristics of the propagation channel are preserved. For example, the average amplitude of the propagation channel between the BTS and the mobile for a signal transmitted at an azimuth of θ is equal, in a long-term average sense, to the amplitude of the propagation channel between the mobile and the BTS for a signal received at the same azimuth θ. Conversely, the instantaneous amplitudes of these channels are not preserved. As a result, the BTS can determine an azimuth angle θ from which a reverse link signal is being received, with the knowledge that a forward link signal transmitted from the BTS in the direction q will, in an average sense, be received by the mobile 112 over the same propagation channel. Present embodiments utilize the detected angles θ and the associated average amplitudes (i.e., the angular power profile) in optimizing an SNR at the wireless or mobile device 112.

In establishing the communication link between the BTS and the mobile, the BTS includes one or more sectors, and typically the one or more sectors each have an array of antenna elements. For example, a sector antenna array can include elements that are typically spaced at half wavelengths, but this spacing can vary. Similarly, the antenna array can include, for example, four or more antenna elements. In optimizing the SNR, a per-user complex weighting vector can be applied to the antenna array so that transmitted signals from the array are narrowed or steered-toward an intended mobile or group of mobiles. Steering the transmitted signal reduces the number of mobiles that may detect the signal and further allows the amount of transmit power to be reduced, thus reducing interference at other mobiles in the network 110. These embodiments attempt to apply a complex weighting (gain and phase) to each of the antenna elements to maximize the SNR at the intended receiving mobile for a given unit of transmit power.

These embodiments achieve the relatively optimized SNR with a minimal amount of information. In particular, these embodiments better optimize the SNR based on a received reverse link angular power as a function of direction. In some alternative prior art systems, such as time division duplex (TDD) systems, attempts to maximize the SNR require the utilization of much more detailed information about the channel than is needed by the present embodiments. TDD systems assume there is substantially a perfect symmetry in the channel so that, if a given channel gain and phase is observed from the mobile at a particular azimuth θ on the reverse link, the same channel gain and phase will be received at the mobile for a forward link signal transmitted from the BTS at this same azimuth θ.

The present embodiments do not assume that the detailed, fine structure of the channel is the same in both directions. Alternatively, these embodiments assume more gross parameters are substantially reciprocal, such as the average gain of the propagation channel, as a function of the azimuth of the signal received from the mobile, and the average gain of the propagation channel, as observed at the mobile, for a signal transmitted from the BTS at this same azimuth. The present embodiments provide optimization criteria to better maximize and/or optimize the SNR at the mobile. Further, the relative optimization can be implemented for both common pilot systems as well as dedicated pilot systems.

In previous systems that utilize common pilots, the common pilot signal is generated by a BTS and used by a mobile to demodulate a received traffic signal. The mobile looks at the pilot signal and estimates the gain and phase of the channel, as a function of multipath delay, and uses the conjugate of these channel estimates to combine the received multipath signals (typically, the conjugate of the channel is used to combine the output of the Rake fingers). These previous systems assume that the estimated channel gain and phase are the same for both the pilot and the traffic signals. Additionally, mobiles of these systems demodulate under the assumption that the same antenna pattern is used to transmit both the pilot and traffic signals. These assumptions break down when attempting to communicate a traffic signal that is directed towards an individual mobile or group of mobiles.

The present embodiments generate a narrowed or steered traffic signal that is directed towards a region of interest such that, in most respects, the traffic beam still matches the pilot, at least over the region of interest. In matching the gain and phase of the traffic signal to the pilot over the region of interest, these embodiments utilize the SNR of the desired signal at the output of the mobile receiver to better optimize and monitor the accuracy of the matching between the pilot and steered traffic signals. Alterations in forming and/or steering the traffic signal may cause disparities between the pilot and the traffic channel resulting in corruption of the combining coefficients used at the receiving mobile. These embodiments incorporate penalties that might be see at the mobile into the SNR and/or signal to interference ratio (SIR) statistics utilized in optimizing the antenna pattern for traffic signal generation.

In systems that use dedicated pilots, the same beam forming coefficients can be utilized in forming the pilot as are used in forming the traffic signals because the pilot is dedicated to just the single mobile or group of mobiles. As such, there is not a penalty associated with dedicated pilot systems for implementing alterations that improve the SNR. The alterations and/or manipulations of the traffic signal do not have to be balanced against corrupting the receiving demodulator by not being matched to the common pilot because the dedicated pilot is transmitted with the same antenna weighting coefficients as used for the traffic signal and thus matched at the receiving mobile.

It is assumed that the angular power profile can be measured, defining where the power is coming from on the reverse link, as well as how strong it is in a particular direction and/or each direction. The angle of reception is preserved and the average signal strength is also preserved when viewed averaged over a sufficient period of time (e.g., 0.5 seconds, 1.0 second, or some other period of time that provides an accurate average). These angles and the average strengths are then utilized to determine the transmit beam that better maximizes the SNR at the mobile per unit of transmit power.

The received channel gain from the mobile as a function of angle is utilized to determine more optimal beam forming. This formulation greatly simplifies the optimization of the beam forming, such that the finer structures of the forward and reverse link channels (such as instantaneous channel gain, and phase as a function of azimuth), do not need to be known. Alternatively, the average channel gain as a function of azimuth is simply utilized while the instantaneous channel phase information is not utilized.

In describing the determination and implementation of the present embodiments, the following parameters are defined:

$f(\theta)$ is complex channel propagation gain as observed at a mobile due to multi-path illuminated by a signal of unity gain transmitted from the BTS in direction theta θ;

$vf(\theta)\|^2$ denotes an angular power profile;

$p(\theta)$ is complex gain of common pilot signal in direction theta θ;

p is the transmit weighting vector applied to an antenna array to synthesize the pilot beam $p(\theta)$ (length=number of elements in the antenna array);

$q(\theta)$ is a complex gain of a traffic signal as transmitted from the BTS in the direction of theta θ;

$d(\theta)$ is a complex gain of a dedicated pilot signal in direction theta θ. It is noted that:

$$d(\theta) = \alpha q(\theta), \quad \text{Eq. 1}$$

for some real, positive constant $\alpha$;

a($\theta$) is an antenna array response vector as a function of angle (length=number of elements); and w is a complex weighting vector applied to the antenna array to obtain an better optimized traffic signal that provides a better maximized SNR at an intended mobile or group of mobiles per unit of transmit power.

Dedicated Pilot Systems

In a dedicated pilot system, the present embodiments typically transmit the pilot signal directed towards an intended mobile or group of mobiles utilizing the same antenna and antenna weighting as used for transmitting the traffic signals to the intended mobile or group of mobiles. A relatively optimal weighting is determined for the antenna to achieve the desired optimal SNR at the mobile. The antenna weighting used for the traffic signal results in the complex gain $q(\theta)$ as a function of direction. The better optimized antenna weighting is defined as a complex weighting vector w.

The product of the channel propagation $f(\theta)$ to the mobile and the traffic complex gain $q(\theta)$ results in the traffic signal as received by the mobile of interest. Similarly, because the system utilizes a dedicated pilot $d(\theta)$ transmitted using the same antenna weighting vector and propagating over the same channel as the traffic signal, the pilot signal as received by the mobile is the product of the complex pilot signal gain $d(\theta)$ times the channel propagation $f(\theta)$, (i.e., $f(\theta)d(\theta)$).

The receiving mobile multiplies the received traffic signal ($f(\theta)q(\theta)$) by the conjugate of the received and measured pilot signal $(f(\theta)d(\theta))^*$ to demodulate the traffic signal. Integrating this product over theta $\theta$ produces a mean value of the signal that is generated as an output of the demodulator of a mobile device. The SNR can be defined as the mean squared value divided by the noise variance at the mobile, given by:

$$SNR = \frac{(\text{mean})^2}{\text{noise variance}} = \frac{(\text{mean})^2}{N_o(\text{energy of pilot})}, \quad \text{Eq. 2}$$

where $N_o$ is the spectral density of the additive white Gaussian noise. Other sources of interference, such as self-interference due to multipath, can be included in the analysis and optimization, though some embodiments may choose to ignore these contributions in the analysis. As a constant in the denominator of Equation 2, the value of the noise spectral density $N_o$ is not going to affect the optimization of the traffic signal $q(\theta)$ for Equation 2.

Referring back to Equation 2, the SNR is the mean value of the output of the demodulator squared, over the noise energy. Multiplying the propagation signal $f(\theta)$ by its conjugate produces the magnitude of the propagation squared, $f(\theta)f(\theta) = \|f(\theta)\|^2$.

The angular power of the propagation can be measured through substantially any method. For example, with CDMA, communications are received over a multi-path channel at a set of different delays. For every delay, an angle or some range of angles (e.g., a scattered channel with a defined density profile) is assigned. The multi-path delays with assigned angles are then combined to obtain the angular power ($\|f(\theta)\|^2$).

As discussed above, in the dedicated pilot systems, the pilot signal $d(\theta)$ is generated using the same beam former as used for the traffic signals $q(\theta)$. As a result, the traffic signal gain is within a multiplicative constant $\alpha$ of the pilot signal gain, as defined by Equation 1 above, $aq(\theta) = d(\theta)$. Therefore, the noise variance is equal to the magnitude of the channel propagation squared times the magnitude of the pilot square, integrated over $\theta$ ($N_o \int \|f(\theta)\|^2 \|d(\theta)\|^2 d(\theta)$), which is equivalent to $N_o \int \|f(\theta)\|^2 \alpha^2 \|q(\theta)\|^2 d(\theta)$.

Because the spectral density of noise $N_o$ cannot be controlled, it is typically assumed a constant, affecting each receiver in the same manner. As a result, the spectral density of noise can be ignored and the SNR is defined as proportional to:

$$SNR = \frac{\left(\int_{\theta=0}^{2\pi} f(\theta)q(\theta)(f(\theta)d(\theta))^* d\theta\right)^2}{\int_{\theta=0}^{2\pi} \|f(\theta)\|^2 \|d(\theta)\|^2 d\theta} \quad \text{Eq. 3}$$

$$= \frac{\left(\int_{\theta=0}^{2\pi} \|f(\theta)\|^2 \alpha \|q(\theta)\|^2 d\theta\right)^2}{\int_{\theta=0}^{2\pi} \|f(\theta)\|^2 \alpha^2 \|q(\theta)\|^2 d\theta}$$

$$= \int_{\theta=0}^{2\pi} \|f(\theta)\|^2 \|q(\theta)\|^2 d\theta.$$

The embodiments attempt to optimize and/or maximize the SNR for a given transmitted power, where the transmitted power is defined as:

$$P = \int_{\theta=0}^{2\pi} \|q(\theta)\|^2 d\theta = 1. \quad \text{Eq. 4}$$

The pilot is typically a fixed proportion of the energy used for the traffic signal. Further, since the fraction of the total power allocated to the pilot signal should not depend on the antenna weighting vector (or equivalently, the antenna pattern) the pilot energy does not affect the analysis and it has not been included in the power P. Because embodiments are attempting, at least in part, to maximize the SNR of the mobile for a fixed amount of transmit power, the power can be set to an arbitrary constant value, for example a value of one (1).

The traffic signal pattern $q(\theta)$ is the result of the application of a weighting vector (w) to the antenna response $a(\theta)$. In maximizing the SNR, the present embodiments attempt to optimize the weighting vector. The relationship between the traffic signal and the weighting vector is defined by a vector of the antenna element responses $a(\theta)$ times the desired weighting vector w that is to be determined. As such, the traffic signal can be defined as $q(\theta) = w(a(\theta))$, and the power P can then be rewritten as:

$$P = \int_{\theta=0}^{2\pi} \|q(\theta)\|^2 d\theta = \int_{\theta=0}^{2\pi} w^H a^H(\theta) a(\theta) w \, d\theta = w^H R w, \quad \text{Eq. 5}$$

where R is the square matrix defined by:

$$R = \int_{\theta=0}^{2\pi} a^H(\theta) a(\theta) d\theta. \quad \text{Eq. 6}$$

The SNR can thus be written as:

$$SNR = \int_{\theta=0}^{2\pi} \|f(\theta)\|^2 \|q(\theta)\|^2 d\theta \qquad \text{Eq. 7}$$

$$= \int_{\theta=0}^{2\pi} \|f(\theta)\|^2 w^H a^H(\theta) a(\theta) w \, d\theta$$

$$= w^H R_f w,$$

wherein the square matrix, $R_f$, which is a function of the propagation channel $f(\theta)$ and the array response vector $a(\theta)$, is defined as:

$$R_f = \int_{\theta=0}^{2\pi} \|f(\theta)\|^2 a^H(\theta) a(\theta) \, d\theta. \qquad \text{Eq. 8}$$

Thus, within a generally fixed constant of proportionality, the SNR of the mobile can be expressed as:

$$SNR = w^H R_f w. \qquad \text{Eq. 9}$$

The embodiments attempt to maximize and/or optimize the SNR, where the SNR can be defined as subject to a unity power constraint on the transmitted power, given by:

$$w^H R w = 1. \qquad \text{Eq. 10}$$

Because the square matrix R is Hermitian positive definite by definition, it can be factored as the product of two matrices (as is known in the art). As such, the R can be factored as:

$$R = Q^H Q. \qquad \text{Eq. 11}$$

Given the above, it can be shown that the transmit weighting vector w that maximizes the signal-to-noise ratio of Equation 9 subject to the unity power constraint of Equation 10 is given by:

$$w = Q^{-1} v_{f,max}, \qquad \text{Eq. 12}$$

where $v_{f,max}$ is the eigenvector associated with the largest eigenvalue $\lambda_{f,max}$ of a resultant matrix $(M_{Rf})$ defined by:

$$M_{Rf} = (Q^H)^{-1} R_f Q^{-1}. \qquad \text{Eq. 13}$$

Therefore, when applying the optimal weighting vector w as defined by Equation 12, the SNR at the mobile device is proportional to the largest eigenvalue, so that:

$$SNR = \lambda_{f,max}. \qquad \text{Eq. 14}$$

The antenna array is typically calibrated, so the antenna array response $a(\theta)$ is a known parameter as a function of angle. As indicated in Equation 6, the matrix R is a function of the known antenna response $a(\theta)$, and as a result the matrix R can be calculated in advance. The matrix R can then be factored to obtain the matrices Q and $Q^H$ in advance of any operations utilizing these factors. The present embodiments utilize the measured or angular power profile of the reverse link channel $\|f(\theta)\|^2$ and readily compute or determine the matrix $R_f$ according to Equation 8.

Once the matrix $R_f$ is computed from the channel, the matrix $M_{Rf}$, defined in Equation 13, can be evaluated, and its largest eigenvalue, $\lambda_{f,max}$, and corresponding eigenvector, $v_{f,max}$, can be extracted. The optimal antenna weighting vector is then given by Equation 12 as the product of $Q^{-1}$ and $v_{f,max}$.

Figure 2:
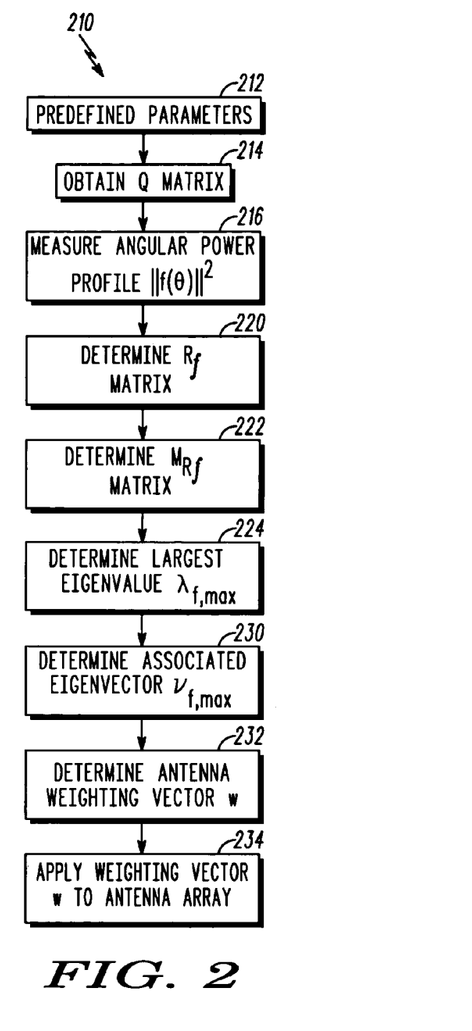
FIG. 2 depicts a simplified flow diagram of a process for determining a weighting vector that can be applied to an antenna array to better optimize a signal-to-noise ratio (SNR) according to predefined parameters.

FIG. 2 depicts a simplified flow diagram of a process 210 for determining a weighting vector that can be applied to an antenna array in attempting to optimize a SNR according to predefined parameters. In step 212, predefined parameters are received and are determined. These parameters include a predefined antenna matrix with an associated known array response vector $a(\theta)$. Similarly, the matrix R is also determined as a function of the known antenna array according to Equation 6. In step 214, the integration factor R is factored to obtain a Q matrix.

In step 216, an angular power profile $\|f(\theta)\|^2$ is measured. In step 220, having a known antenna array response vector $a(\theta)$ and having measured the angular power profile, the matrix $R_f$ is determined according to Equation 8. In step 222, a matrix $M_{Rf}$ is determined according to Equation 13. In step 224, the largest eigenvalue $\lambda_{f,max}$ is determined for the weighting matrix.

In step 230, having determined the largest eigenvalue, an eigenvector $v_{f,max}$ associated with the largest eigenvalue is determined. In step 232, the associated eigenvector $v_{f,max}$ is utilized along with the Q matrix according to Equation 12 to determine an optimal weighting vector w to better maximize the SNR as seen at the mobile per unit of transmit power. In step 234, the weighting vector w is applied to the antenna array in transmitting the traffic signal to an intended destination mobile device achieving a desired steered beam that provides the better optimized SNR at the mobile as defined above.

It is not uncommon for a system with one or more dedicated pilot signals to additionally include a common pilot signal. Dedicated pilots can be defined for individual mobiles, or individual groups of mobiles. For example, in a system providing WCDMA wireless communication, the system typically includes a common pilot as well as a per-user pilot. In systems providing CDMA, the systems typically only include common pilots. However, these CDMA systems can include an auxiliary pilot that is usually used for a group of users. If a traffic signal is alternatively communicated over the pilot beam and the unit energy constraint is applied, the mobile SNR can be defined as:

$$SNR = \frac{p^H R_f p}{p^H R p}. \qquad \text{Eq. 15}$$

Thus, the reduction in the transmit power for the traffic channel from the use of the narrower transmit beam is given by:

$$10 \log\left(\lambda_{f,max} \frac{p^H R p}{p^H R_f p}\right) \qquad \text{Eq. 16}$$

As discussed above, the calculation of optimal antenna weighting vectors can be computationally demanding on the processor, as well as time consuming. As a result, generation of the weighting vectors w in real-time may be either computationally prohibitive or excessively time consuming. The determination of the weighting vector w as described above for dedicated pilot systems, assumes knowledge, typically obtained through measurement, of the complex gain of the reverse link propagation channel $f(\theta)$ as observed at the BTS. Further, as described above, the channel matrix $R_f$ depends on the amplitude of the reverse link channel propagation $f(\theta)$, and the antenna response $a(\theta)$, which is known a priori. Thus, computation of the optimal transmit antenna weighting vector w depends on the measured amplitude of the reverse link propagation channel $f(\theta)$ (in addition to other parameters that are assumed to be known in advance, such as the response a(θ), and the matrices R and Q which are a function of a(θ)).

The computation of the matrices $R_f$ and $M_{Rf}$, the determination of the maximum eigenvalue of $M_{Rf}$ and its associated eigenvector, and the computation of the weighting vector w can be computationally costly and/or time consuming and may be computationally prohibitive for some embodiments.

To reduce the computation requirements of a base station or other network device determining one or more weighting vectors, some embodiments utilize predetermined and/or pre-calculated weighting vectors w. Typically, the angular power profiles are partitioned into a finite set of classes or categories, and a separate weighting vector w is assigned to each class. The class definitions and the assigned weighting vector for each assignment are designed so that the weighting vector assigned to a given class will be approximately optimal for all channels that fall within the given class. Many channel class definitions are possible, and the most reasonable of these would seem to assign a center azimuth and beam width to each possible channel response $\|f(\theta)\|^2$. The number of classes would be determined by the sizes of the center azimuth and beam width steps used in defining the classes.

In some embodiments implemented in some wireless communication networks, such as frequency division duplexing (FDD) systems, the angles-of-arrival of the multi-path signals received at the base station are one of the dominant factors in determining the weighting vector w, as discussed above. More specifically, the long-term average of the amplitude of the reverse link channel as a function of the azimuth θ is correlated with the long-term average of the fading amplitude of the forward link channel for signals transmitted from the BTS to the mobile at an azimuth θ. In some embodiments, the angular spread of the channel can be mostly simply characterized by the boundaries and an interval, for example $\theta_{min}$ and $\theta_{max}$, covering the angular region over which the amplitude of the channel between the BTS and the mobile is non-zero.

Again, the weighting vector w as defined above by Equation 12 is dependent on the matrix Q and the determined eigenvector $v_{f,max}$, where the eigenvector in turn is dependent on the matrix $R_f$. The Q matrix can be pre-computed by factoring the matrix R, which is also known, and depends only on the antenna response vector a(θ). However, the channel matrix $R_f$, is typically computed separately for each mobile and depends on the profile measured angular power profile $\|f(\theta)\|^2$ of the particular mobile under consideration. To avoid the need to compute the matrices $R_f$ for each mobile in real-time, the set of possible propagation channels $\|f(\theta)\|^2$ can be partitioned into a finite set of classes, with each class represented by a channel that is sufficiently close, by some measure, to represent all channels that fall within the class. Once the classes and the representative of each class have been defined, the matrices $R_f$ can be pre-computed for each class, and the maximum eigenvector $v_{f,max}$ for each $R_f$ matrix can be pre-computed.

In the most general sense, the angular power profile can be substantially any non-negative real function defined on the interval from 0 to $2\pi$. Thus, some embodiments attempt to limit the set of angular power profiles.

In some embodiments, the angle boundaries of the angular spread of the channel for the mobile of interest are defined by minimum and maximum angles $\theta_{min}$ and $\theta_{max}$. The amplitude of the complex channel propagation f(θ) can be classified according the minimum and maximum angles ($\theta_{min}$ and $\theta_{max}$) over which it is substantially non-zero. As such, a function $t_{\theta_{min},\theta_{max}}(\theta)$ is defined as follows:

$$t_{\theta_{min},\theta_{max}}(\theta) = \begin{cases} 1 & \theta_{min} \leq \theta \leq \theta_{max} \\ 0 & \text{else,} \end{cases}$$

where the function is unity between the boundary limits and zero (θ) outside the boundaries. In order to limit the number of channels for which the matrix $R_f$ and eigenvector $v_{f,max}$ must be pre-computed, it may be desirable to choose a finite set of azimuth pairs ($\theta_{min},\theta_{max}$) and a mapping which maps the amplitude of any channel propagation function f(θ) into the resulting finite set of functions to $t_{\theta_{min},\theta_{max}}(\theta)$ For example, if the amplitude of the measured angular power profile is found to be substantially non-zero in the azimuth interval from 0 to 5 degrees, substantially zero in the interval from 5 to 10 degrees, and substantially non-zero in the interval from 10 to 15 degrees, the function $t_{0,15}(\theta)$, which is unit-valued on the interval from 0 to 15 degrees and zero otherwise, can be chosen as the closest match for the channel. This mapping of all possible amplitude functions $\|f(\theta)\|$ into a finite set of functions of type $t_{\theta_{min},\theta_{max}}(\theta)$ limits the number of matrices $R_f$ and eigenvector $v_{f,max}$ that are pre-computed.

Some embodiments determine the region over which the magnitude of the angular power profile for each mobile is significantly non-zero, possibly using a threshold, and determine the minimum and maximum azimuth angles covering the interval over which the power profile is substantially non-zero. The interval ($\theta_{min},\theta_{max}$) is then mapped to a nearest pair ($\theta_1,\theta_2$) for which the matrix Rf and eigenvector $v_{f,max}$, corresponding to $f=t_{\theta_1,\theta_2}(\theta)$, have been pre-calculated. A small enough set of pairs ($\theta_1,\theta_2$) are typically provided such that a library, table, list and the like can be generated with pre-computed values, and the look-up can be performed for measured angular power profiles.

For each of the finite set of pairs ($\theta_1,\theta_2$) used to define the function $t_{\theta_1,\theta_2}(\theta)$, $R_t$ can be determined according to:

$$R_t = \int_{\theta=0}^{2\pi} \|t(\theta)\|^2 a^H(\theta) a(\theta) d\theta = \int_{\theta_{min}}^{\theta_{max}} a^H(\theta) a(\theta) d\theta. \quad \text{Eq. 17}$$

Having pre-calculated the channel the matrix $R_t$, and with the matrix Q pre-calculated from the known antenna response a(θ), the largest eigenvalue $\lambda_{f,max}$ and corresponding eigenvector $v_{t,max}$ can be pre-computed for each matrix $M_{Rt}$ defined by:

$$M_{Rt} = (Q^H)^{-1} R_t Q^{-1}. \quad \text{Eq. 18}$$

Similarly, the weighting vectors w and the corresponding SNRs can be pre-computed for each $t_{\theta_1,\theta_2}(\theta)$ according to:

$$w = Q^{-1} v_{t,max}; \text{ and} \quad \text{Eq. 19}$$

$$SNR = v_{t,max}{}^H (Q^H)^{-1} R_t Q^{-1} v_{t,max}, \quad \text{Eq. 20}$$

respectively.

The vectors w can be generated by the base station as the angular power profile is measured, or in advance for a finite set of channels $t_{\theta_1,\theta_2}(\theta)$ (or other finite set of functions) and stored on the BTS or other network device communicating the traffic signal. For example, a weighting vector table can be pre-calculated and stored on a BTS prior to deployment, or forwarded and stored from a central distributor, such as a central control terminal coupled with the network 122 and/or a mobile switching center MSC 120. Table 1 below shows an example of a weighting vector look-up table according to one embodiment.

Figure 4:
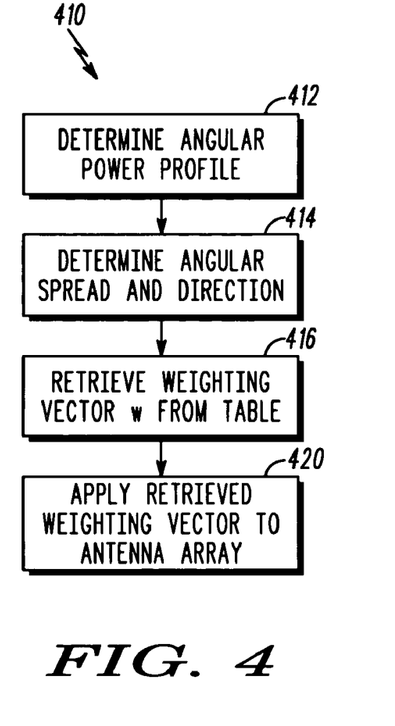
FIG. 4 depicts a simplified flow diagram of a process for applying weighting vectors as retrieved from a weighting table or library.

FIG. 4 depicts a simplified flow diagram of a process 410 for use in retrieving an antenna array weighting vectors w from a weighting vector table or library, and applying the

TABLE 1

Weighting Vector Look-Up Table

ANGULAR WIDTH = $\theta_2 - \theta_1$

| | | $i_0$ | $i_1$ | ... | $i_n$ |
|---|---|---|---|---|---|
| DIRECTION = $(\theta_1 + \theta_2)/2$ | $j_0$ | $wj_0, i_0 = (wj_0, i_{0\,0},$ $wj_0, i_{0\,1}, \ldots, wj_0, i_{0\,n})$ | $wj_0, i_1 = (wj_0, i_{1\,0},$ $wj_0, i_{1\,1}, \ldots, wj_0, i_{1\,n})$ | ... | $w_{0n} = (\lambda 0 n_0 + \lambda 0 n_1 + \ldots + \lambda 0 n_n)$ |
| | $j_1$ | $wj_1, i_0 = (wj_1, i_{0\,0},$ $wj_1, i_{0\,1}, \ldots, wj_1, i_{0\,n})$ | $wj_1, j_1 = (wj_1, i_{1\,0},$ $wj_1, i_{1\,1}, \ldots, wj_1, i_{1\,n})$ | ... | $w_{1n} = (\lambda 1 n_0 + \lambda 1 n_1 + \ldots + \lambda 1 n_n)$ |
| | . | . | . | | . |
| | . | . | . | | . |
| | . | . | . | | . |
| | $j_n$ | $wj_n, i_0 = (wj_n, i_{0\,0},$ $wj_n, i_{0\,1}, \ldots, wj_n, i_{0\,n})$ | $wj_n, j_1 = (wj_n, i_{1\,0},$ $wj_n, i_{1\,1}, \ldots, wj_n, i_{1\,n})$ | ... | $w_{nn} = (\lambda n n_0 + \lambda n n_1 + \ldots + \lambda n n_n)$ |

Figure 3:
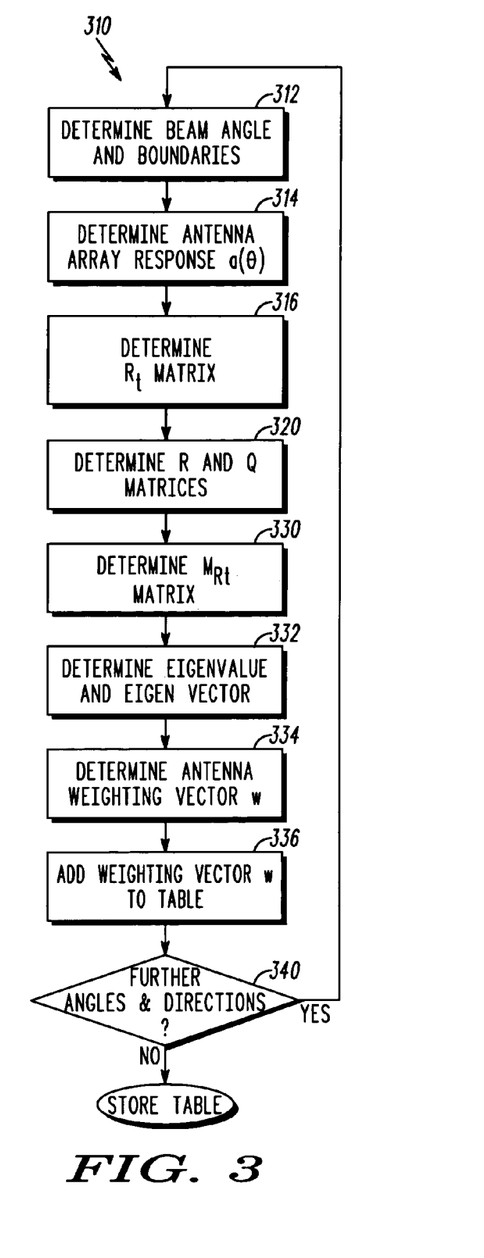
FIG. 3 depicts a simplified flow diagram of a process for pre-calculating and generating a weighting vector table according to one embodiment.

Thus, a weighting vector table can be pre-calculated to allow the weighting vector w for each channel amplitude $\|f(\theta)\|$ to be accessed via a look-up table rather than calculated in real-time. The table can be parameterized based on the angular spread $(\theta_2-\theta_1)$ and the center direction $((\theta_1+\theta_2)/2)$ of the measured channel amplitude $\|f(\theta)\|$ for each mobile. FIG. 3 depicts a simplified flow diagram of a process 310 for pre-calculating and generating a weighting vector table according to one embodiment. In step 312, an angular spread and direction are determined for the reverse link measured channel amplitude $\|f(\theta)\|$ for a particular mobile, and minimum and maximum boundaries $(\theta_{min}, \theta_{max})$ are determined. The determination of the angular spread and direction of the reverse link channel amplitude $\|f(\theta)\|$ can be based on measurements of an actual signal or calibration signal. Alternatively, the angular spread and direction can be selected from values of the angular spreads and directions that are expected for a given network 110, the devices of the network and their deployment.

In step 314, an antenna array response vector $a(\theta)$ is determined based on a known antenna array. Having chosen the values of $\theta_{min}$ and $\theta_{max}$ for the reverse link channel $\|f(\theta)\|$, the values $\theta_{min}$ and $\theta_{max}$ define the function $t_{\theta_1,\theta_2}(\theta)$ and can also be mapped to an angular spread, $(\theta_2-\theta_1)$, and direction, $((\theta_1+\theta_2)/2)$. factoring step 316, given the function $t_{\theta_1,\theta_2}(\theta)$, $R_t$ is determined, such as according to Equation 17. In step 320, an integration matrix R is determined, for example with Equation 6, and a Q matrix is determined by factoring the matrix R.

With knowledge of the matrices Rt and the Q, step 330 is entered in which the matrix $M_{Rt}$ is pre-computed according to Equation 18. Once the matrix $M_{Rt}$ is computed, step 332 is entered where the maximum eigenvalue $\lambda_{f,max}$ and associated eigenvector $v_{t,max}$ are determined. In step 334, a weighting vector w is determined according to Equation 19 as the product of the matrix Q and the eigenvector $v_{t,max}$. In step 336, the calculated weighting vector w is added to a weighting vector table defined by the angular width and associated direction of the amplitude of the channel $\|f(\theta)\|$. In step 340, it is determined if further angular spreads and directions are to be obtained. If further angular spreads and directions are to be obtained, the process returns to step 312. If further angular spreads and directions are not to be obtained, the table is stored in memory for future access. In some embodiments, the table can be stored or re-stored in memory following the addition of each determined weighting vector w.

retrieved weighting vectors w. In step 412, an angular power profile of a reverse link signal as a function of a direction is determined. In step 414, an angular spread and direction are determined from the angular power profile. In step 416, a weighting vector w is retrieved from the pre-calculated weighting vector table associated with the angular spread and direction. In step 420, the retrieved weighting vector is applied to the antenna array and a traffic signal is generated from the antenna array as the weighting vector is applied.

Classification of channels is provided through the table look up based on the reverse link measurement at the BTS of the channel angular power, where the set of channels that are considered would be limited. From the table a corresponding antenna weighting w can be selected according to the measurements.

The power savings provided by the transmission of the traffic and/or pilot signal according to the determined weighting vector can be significant. In an instance where the angular spread of the channel is known, the reduction in transmit power for the traffic and/or pilot beam narrowed according to the determined weighting vector is given by (in dB):

$$10 \log\left( v_{t,max}^H (Q^H)^{-1} R_t Q^{-1} v_{t,max} \frac{p^H R p}{p^H R_t p} \right). \qquad \text{Eq. 21}$$

Common Pilot Systems

Some alternative embodiments provide a weighting vector w for traffic signals with systems that employ a common pilot. In common pilot systems, the common pilot is typically communicated to a plurality of mobile devices. The mobile devices utilize the common pilot, at least in part, to estimate the propagation channel between the base station and the mobile and enable proper demodulation of the traffic signals directed at one or more of the mobile devices. However, if the beam used to transmit the traffic signal to the mobile is to be optimized separately for each mobile, the traffic signal is by necessity not communicated over the same beam as the common pilot signal. As a result, for a given mobile, the propagation channel traversed by the pilot signal will in general be different than the propagation channel traversed by the traffic signal. Thus, the criteria for optimizing the beam used to transmit the traffic signal to a particular mobile account for the effect of potential mismatches between the propagation channels for the pilot and traffic channels en route to the mobile on the performance of the receiver. In the optimization criteria method described in the present embodiments, the differences between the pilot and traffic channels are compensated for in weighting vectors that are generated in order to more fully optimize the SNR in common pilot systems.

For systems that utilize a common pilot, the SNR as measured at a mobile is again proportional to the mean squared value of the traffic signal divided by the noise energy, as reflected in the following expression:

$$SNR = \frac{\left(\int_{\theta=0}^{2\pi} f(\theta) q(\theta)(f(\theta) p(\theta))^* d\theta\right)^2}{\int_{\theta=0}^{2\pi} \|f(\theta)\|^2 \|p(\theta)\|^2 d\theta}$$

$$= \frac{\left(\int_{\theta=0}^{2\pi} \|f(\theta)\|^2 q(\theta) p^*(\theta) d\theta\right)^2}{\int_{\theta=0}^{2\pi} \|f(\theta)\|^2 \|p(\theta)\|^2 d\theta}.$$

Eq. 22

The SNR expression defined by Equation 22 is substantially similar to the SNR defined by Equation 3. However, it is noted that in the common pilot implementation, the received common pilot signal $p(\theta)$ is no longer equal to the received traffic signal $q(\theta)$ multiplied by a real positive constant. As a result, the pilot signal and the traffic signal are maintained separately in the calculation of the SNR, and the SNR for the common pilot implementation is thus dependent on the common pilot $p(\theta)$ and pilot weighing vector p used to generate $p(\theta)$.

Again, the pilot signal is a product of the antenna row vector $a(\theta)$ and the pilot column vector p. The magnitude squared of the pilot weighting vector $\|p(\theta)\|^2$ can thus be rewritten as $p^H a^H(\theta) a(\theta) p$ and substituted into Equation 22. The SNR at the output of the mobile demodulator is defined as the ratio of the square of the absolute value of the mean to the variance, and can be expressed as:

$$SNR = \frac{\left(\int_{\theta=0}^{2\pi} \|f(\theta)\|^2 p^H a^H(\theta) a(\theta) w d\theta\right)^2}{\int_{\theta=0}^{2\pi} \|f(\theta)\|^2 p^H a^H(\theta) a(\theta) p d\theta} = \frac{(p^H R_f w)^2}{p^H R p},$$

Eq. 23 where the spectral density of the background additive white Gaussian noise, $N_0$, has been dropped from the denominator, as this multiplicative does not affect the optimization of the beam forming vector w.

Due to the use of the common pilot for demodulation, the denominator is independent of the vector w used to generate the beam for the traffic signal, and depends only on p, the vector used to generate the common pilot. The embodiments strive to maximize and/or optimize the SNR at the mobile, subject to a constraint on the transmitted power, such as that defined by Equation 10, where $w^H R w = 1$. Because the denominator of Equation 23 is independent of the vector w used to generate the traffic beam, but rather depends on the common pilot beam generated with the vector p, the optimization of w has no affect on the denominator (or equivalently, the noise variance at the output of the demodulator). Therefore, some embodiments substantially ignore the denominator and recognize that the SNR can be maximized, for a fixed transmit power, by maximizing the numerator of Equation 23, given by:

$$p^H R_f w,$$

subject to the constraint that $w^H R w = 1$.

Based on these determinations, the weighting vector w for the given traffic channel is then given by:

$$w = Q^{-1} \frac{(Q^H)^{-1} R_f p}{\|(Q^H)^{-1} R_f p\|} = \frac{R^{-1} R_f p}{\|(Q^H)^{-1} R_f p\|}.$$

Eq. 24

Utilizing this weighting vector w, a resulting SNR seen at the output of the mobile demodulator is given by:

$$SNR = \left(\frac{p^H R_f R^{-1} R_f p}{\|(Q^H)^{-1} R_f p\|}\right)^2 \frac{1}{p^H R p}$$

$$= \frac{1}{\|(Q^H)^{-1} R_f p\|^2} \frac{(p^H R_f R^{-1} R_f p)^2}{p^H R p}.$$

Eq. 25

With the above SNR, the reduction in transmit power (in dB) from the use of a narrow traffic beam generated from the weighted antenna array is given by:

$$P = 10 \log\left(\frac{1}{\|(Q^H)^{-1} R_f p\|^2} \frac{(p^H R_f R^{-1} R_f p)^2}{p^H R_f p}\right) \cdot (dB)$$

Eq. 26

Figure 5:
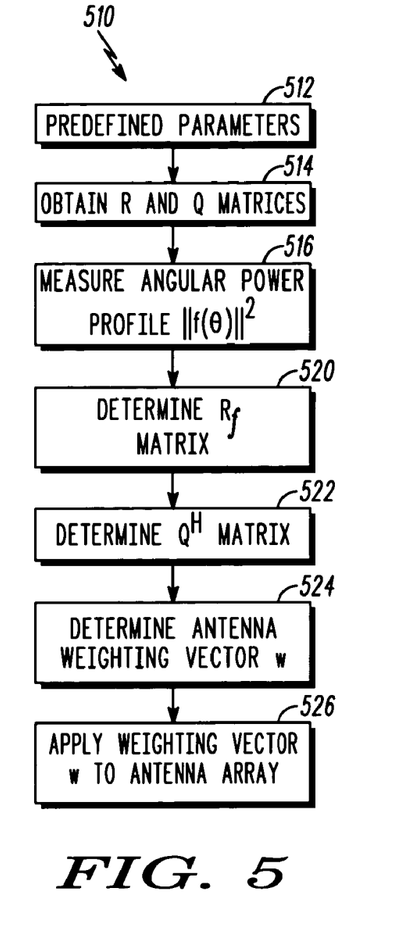
FIG. 5 depicts a simplified flow diagram of a process for determining a weighting vector that can be applied to an antenna array to better optimize a SNR according to predefined parameters in a common pilot system.

FIG. 5 depicts a simplified flow diagram of a process 510 for determining a weighting vector that can be applied to an antenna array to better optimize an SNR according to predefined parameters in a common pilot system. In step 512, predefined parameters are received and/or are determined. These parameters can include a predefined antenna matrix with an associated known array response vector $a(\theta)$, a pilot weighting vector p (typically a fixed parameter for the system), and a matrix R that can be determined as a function of the known antenna array response according to Equation 6. In step 514, the matrix R is factored to obtain the matrix Q.

In step 516, an angular power profile $\|f(\theta)\|^2$ is measured. In step 520, having a known antenna array response vector $a(\theta)$ and having measured the angular power profile, the matrix $R_f$ is determined according to Equation 8. In step 522, Hermitian (complex conjugate transpose) of the matrix Q is determined. In step 524, a desired antenna weighting vector w is calculated based on the matrix R, the matrix $R_f$, the pilot weighting vector p, and the Hermitian of the matrix Q, according to Equation 24, to better optimize the SNR as seen at the mobile. In step 526, the weighting vector w is applied to the antenna array in transmitting the traffic signal to an intended destination mobile device, and thus achieves the desired narrowed and/or steered beam that provides a more optimized SNR at the mobile.

As in the dedicated pilot case discussed above, the matrix R is a function of the known antenna array, defined by Equation 15 as $a^H(\theta)a(\theta)$ integrated over the range of zero to $2\pi$ radians, and is thus a known parameter. As previously, the positive Hermitian matrix R can be factored as the product of the matrix Q and its complex conjugate $Q^H$, as defined in Equation 11, and thus the matrix Q factors is also a known parameter. A single common pilot beam is used for each sector, and the known weighting vector p is used to generate this beam. Therefore, the unknown parameter for generating the traffic beam for a particular mobile is the matrix $R_f$.

The channel matrix $R_f$, previously defined by Equations 8 and 17, are determined separately for each mobile using the measured channel angular power profile $\|f(\theta)\|^2$ for that mobile. With the channel matrix $R_f$ calculated, the weighting vector w for the target mobile can be calculated and applied to the antenna array to generate the transmit beam for target mobile's traffic signal.

In some embodiments, the matrix Rf is calculated in real-time as the angular power is detected and/or measured by the BTS. In combination with the previously described known parameters, the optimal weighting vector w for generating the traffic signal beam can be calculated by substitution of $R_f$ into Equation 24. Alternatively, in a manner similar to that described in the previous section and illustrated in Table 1, some embodiments of a common pilot systems may employ a list, library or table of antenna weighting vectors, where each vector w is optimal or nearly optimal for some range of angular spread functions $\|f(\theta)\|^2$. In one implementation, an interval, specified by azimuth angles $\theta_{min}$ and $\theta_{max}$, is defined over which the angular spread function is substantially non-zero. As in the previous section, the limited function $t(\theta_1, \theta_2)$ is defined such that $t(\theta_1, \theta_2)$ is "1" within the interval $\theta_{min} < \theta < \theta_{max}$, and zero otherwise. For a finite set of pairs of angles $(\theta_1, \theta_2)$, the optimal vector w for generating the beam for the traffic channel is pre-computed by inserting the matrix $R_{t(\theta_1, \theta_2)}$ in Equation 24. A channel $\|f(\theta)\|^2$ is then measured for each mobile, and this channel is mapped into the interval $(\theta_1, \theta_2)$ in the table which is closest (in some appropriate sense) to the measured channel. The weighting vector corresponding to this particular channel, which has already been computed using Equation 24 and inserted into the table, is then selected and used to generate the traffic signal beam for the given mobile.

For a channel with angular spread $\|f(\theta)\|^2 = t(\theta_1, \theta_2)$, the optimal transmit beam weighting vector is given by:

$$w = \frac{R^{-1}R_t p}{\|(Q^H)^{-1}R_t p\|}. \qquad \text{Eq. 27}$$

As noted previously, the matrix R can be calculated from the array response $a(\theta)$, and the matrix Q can be determined by factoring R. Similarly, the weighting vector p used to generate the pilot is fixed and known. Therefore, the embodiments can pre-calculate the weighting vector w based pre-defined set or sets of angular spread functions of type $\|f(\theta)\|^2 = t(\theta_1, \theta_2)$. A look-up library or table can be generated with the pre-calculated weighting vectors to allow for the rapid utilization of the weighting vector while limiting the computational requirements. The table would depend on the antenna response and the pilot weighting vector, which are both known, and the class of angular spread channels under consideration.

When applied to the antenna array, the weighting vector w produces a narrow or shaped transmit beam that improves the SNR at the mobile, which is given by:

$$SNR = \left(\frac{p^H R_f R^{-1} R_t p}{\|(Q^H)^{-1}R_t p\|}\right)^2 \frac{1}{p^H R p} \qquad \text{Eq. 28}$$

$$= \frac{1}{\|(Q^H)^{-1}R_t p\|^2} \frac{(p^H R_f R^{-1} R_t p)^2}{p^H R p}.$$

Further, the reduction in transmit power from the use of the narrow beam is given (in dB) by:

$$P = 10 \log\left(\frac{1}{\|(Q^H)^{-1}R_t p\|^2} \frac{(p^H R_f R^{-1} R_t p)^2}{p^H R_f p}\right). \qquad \text{Eq. 29}$$

Figure 6:
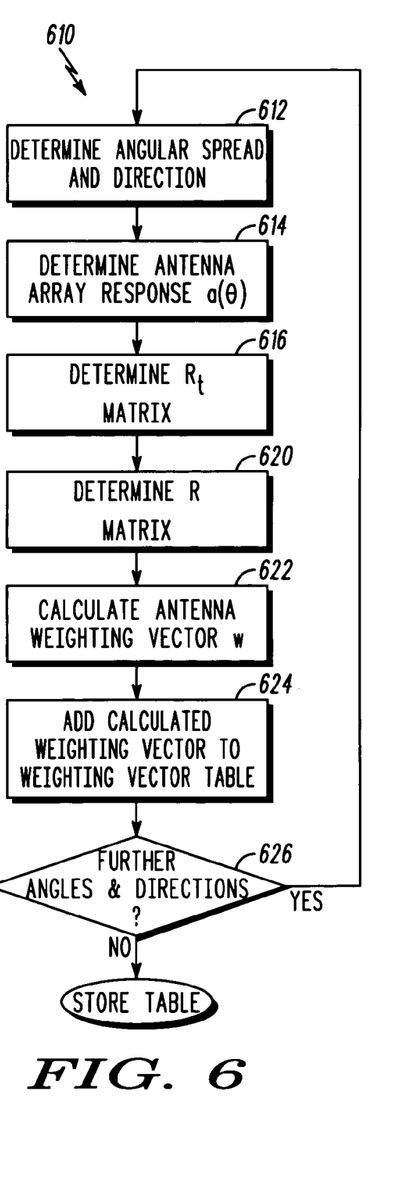
FIG. 6 depicts a simplified flow diagram of a process for pre-calculating and generating a weighting vector table for common pilot systems according to some embodiments.

FIG. 6 depicts a simplified flow diagram of a process 610 for pre-calculating and generating a weighting vector table for common pilot systems according to some embodiments. In step 612, the angular spread of the reverse link channel is measured and boundaries $(\theta_{min}, \theta_{max})$ are determined. In step 614, an antenna array response vector $a(\theta)$ is determined based on the known antenna array. In step 616, the matrix $R_t$ is determined for $t(\theta_{min}, \theta_{max})$, such as according to Equation 17. In step 620, the matrix R is determined, for example with Equation 6, and the matrix Q is determined by factoring the matrix R.

The common pilot weighting vector p is known. In step 622, the pilot vector p, and the matrices $R_t$, R, and Q factor are utilized according to Equation 27 to determine the antenna weighting vector w for a measured or selected angular power profile. In step 624, the calculated weighting vector w is added to the weighting vector table. In step 626, it is determined if further angular spread channels are to be included in the table. If further angular spread channels are to be included, the process returns to step 612. If further angular spread channels are not to be included, the table is stored in memory for future access.

In some embodiments for both or either the dedicated pilot and common pilot systems, the accuracy of the weighting vectors w can be determined and adjustments made to further optimize the SNR. Some embodiments measure the SNR at the target mobile and communicate this information over the reverse link to the BTS.

Figure 7:
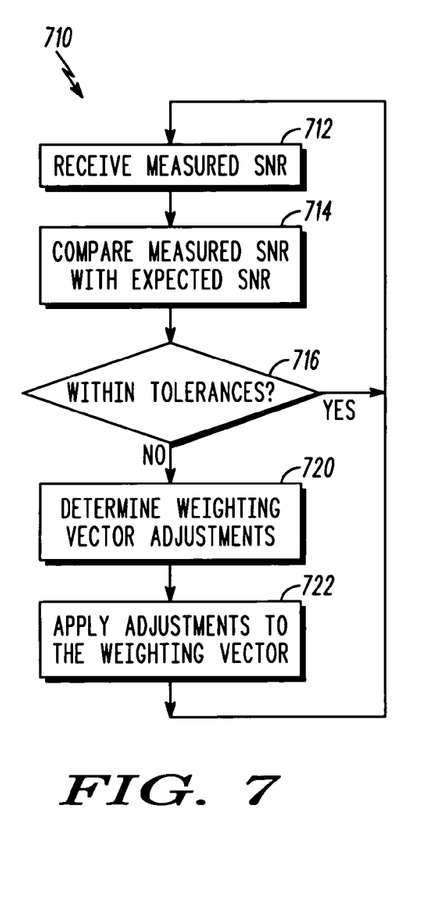
FIG. 7 depicts a simplified flow diagram of a process for verifying the accuracy of determined weighting vectors.

FIG. 7 depicts a simplified flow diagram of a process 710 for verifying the accuracy of determined weighting vectors w. This process can be utilized for either dedicated pilot systems or common pilot systems. In step 712, the BTS receives a measured SNR as measured or otherwise determined by the mobile based on the received traffic signal and pilot signal. In some embodiments, the BTS performs the actual SNR calculation and simply receives measurement data from the mobile. In step 714, the BTS compares the measured SNR determined by the mobile against an expected SNR that was computed according to Equations 3, 9, 14, 23, 25 and/or 28. In step 716, it is determined if the measured SNR at the mobile is within predefined tolerances of the expected SNR.

If the measured SNR is within the tolerances, the process 710 returns to step 712 to continue monitoring the measured SNR at the mobile. If the measured SNR is not within the tolerances, the process continues to step 720 where adjustments to the weighting vector w are determined. In step 722, the adjustments to the weighting vector are implemented. The process then returns to step 712 to continue the monitoring of the measured SNR at the mobile.

Some embodiments determine the adjustments that are applied to the weighting vector by providing real-time calculations of the weighting vector w, while the initial weighting vector was determined from a look-up table. For example, the BTS can retrieve an angular power profile that was measured when determining the initial weighting vector. The BTS can perform calculations in the background while still processing and communicating data to the mobile and/or receiving data from the mobile, including the continued calculation of more optimal weighting vectors, for example through the look-up table(s).

The BTS can calculate the matrix $R_f$. The weighting vector w can then be determined according to Equation 24 for common pilot systems. Alternatively, the BTS can determine the resulting matrix $M_{Rf}$, and determine the eigenvector $v_{f,max}$. Once the eigenvector is known, the weighting value can be determined as defined by Equation 12. In some embodiments, the calculated weighting vector can be added to a look-up table with an associated angular spread channel, thus adding granularity to the look-up table.

Figure 8:
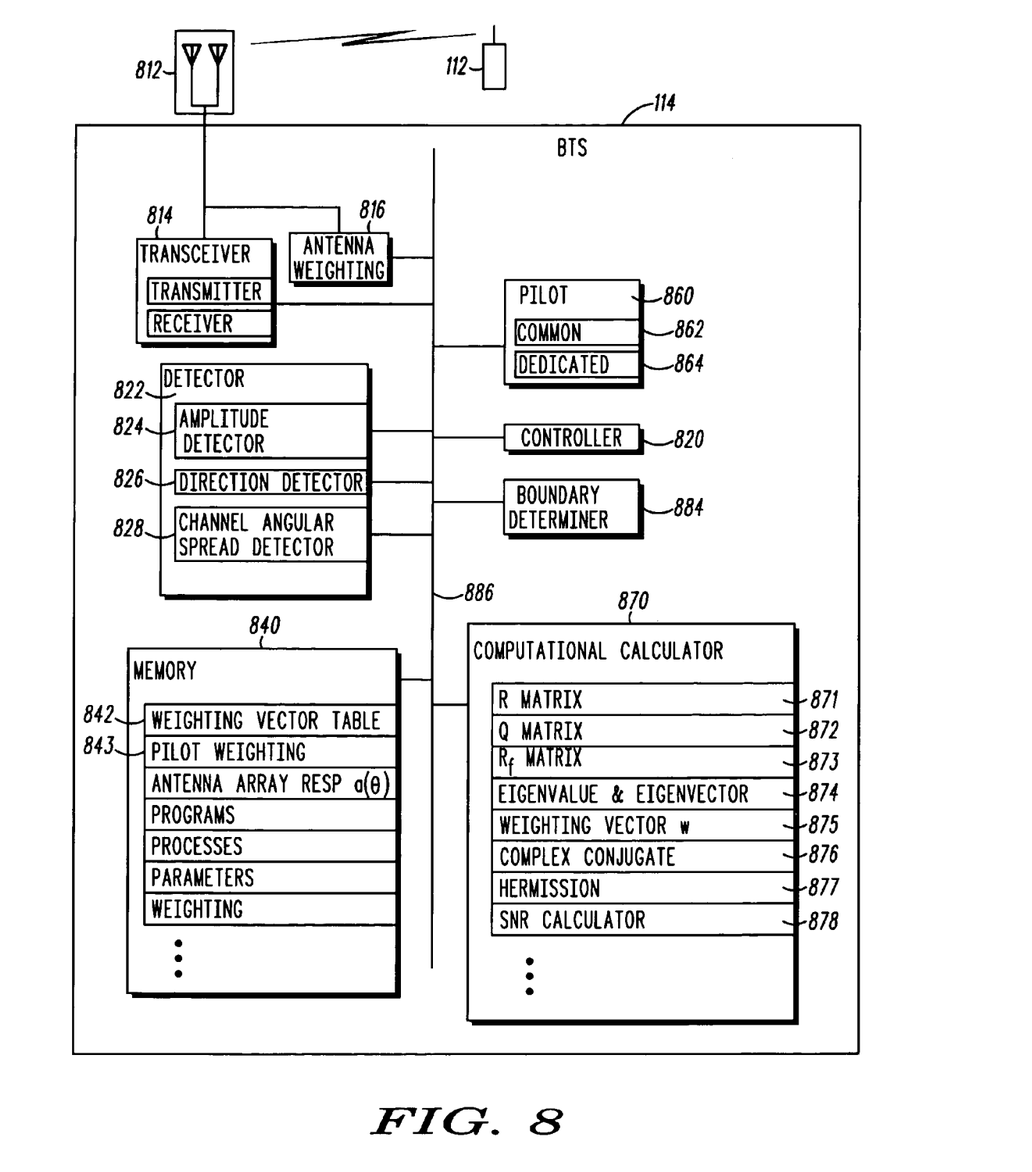
FIG. 8 depicts a simplified block diagram of a base station or base transceiver station according to one embodiment.

FIG. 8 depicts a simplified block diagram of a base station or base transceiver station (BTS) 114 according to some embodiments. The BTS wirelessly communicates with one or more mobile devices 112 over pilot and traffic channels. The BTS can be configured to provide common pilot signals, dedicated pilot signals and/or both common and dedicated pilot signals. For example, the BTS 114 can utilize the dedicated pilot for one or more predefined mobiles while utilizing a common pilot for other mobiles.

The BTS includes one or more sectors 812, and typically the one or more sectors each have an array of antenna elements. For example, a sector can include an antenna array with elements that are typically spaced at half wavelengths. The antennas are electrically connected with a transceiver 814. The transceiver includes a transmitter for formatting and transmitting outgoing communications over at least the forward channel to the mobiles 112 or other devices, and a receiver for receiving, processing, demodulating, decoding and other similar processing of signals received over at least the reverse channel. An antenna weighting device 816 is also included that is used to apply a separate antenna weighting vector w, optimized separately for each mobile, to the antenna array 812, in order to generate the traffic channel beam used to transmit the traffic signal. In some embodiments, the weighting device 816 can be included in the transceiver 814 or in a controller 820, or other components of the BTS 114.

The received signals are forwarded from the transceiver 814 to a reverse channel detector 822. The detector detects or measures the angular power profile of the received signal for each mobile. In some embodiments, the detector includes an amplitude detector 824 for detecting amplitudes $\|f(\theta)\|$ and/or the square of the amplitude $\|f(\theta)\|^2$, for an azimuth 0 of the received reverse link signal from a given mobile, an azimuth ($\theta$) direction detector 826 determined as an angle of reception and/or transmission for the given mobile, a channel angular spread detector 828, and other similar detectors.

In some embodiments, the detected amplitudes, angles, angular spreads are forwarded to the controller 820. The controller utilizes the detected information and can access a weighting vector table 842 stored in a memory 840. From the weighting vector table the controller can retrieve an antenna weighting vector w based on the detected parameters of the reverse channel signal. The weighting vector can be forwarded to the antenna weighting device 816 and applied to the traffic signal transmitted over the forward channel to the mobile of interest 112. Similarly, when the BTS 114 is providing dedicated pilot signals, the antenna weighting device can apply the determined antenna weighting vector w to both the traffic signal and the dedicated pilot signal of the mobile of interest and transmitted over the forward channel.

Some embodiments include a pilot device 860 that provides pilot signal generation. The pilot device 860 can include a common pilot device 862 and a dedicated pilot device 864. The pilot signals are used to enable the mobile to estimate the forward link channel between the BTS and the mobile and combine the signal at the mobile appropriately. The common pilot is transmitted over a beam with pattern p($\theta$) generated by the pilot weighting vector p, while the beam for the dedicated pilot is the same as the beam for the traffic channel signal and is generated with a weighting vector w, that is a function of the measured angular spread of the reverse link channel for the mobile of interest. Because the dedicated pilot is transmitted over the same beam as the traffic channel, the dedicated pilot device 864 receives the weighting vector w for the traffic signal from the controller 820 and/or a computation calculator 870. The common pilot device 862 receives the pilot weighting vector p 843 from memory. For a given mobile, the dedicated pilot device 864 uses the same beam for the dedicated pilot as is used for the traffic channel signal, and can determine and maintain dedicated pilot information and parameters for any number of mobiles.

The computational calculator and/or processor 870 can be a separate device, can be part of the controller, or part of another processor or processors. The computational calculator can be implemented through any processor, microprocessor, computer, combination of processors, microprocessors and/or computers, and/or other devices providing computational processing. In some embodiments the computational calculator may include calculators for the matrix R in 871, the matrix Q in 872, the matrix $_{Rf}$ in 873, the eigenvalue $\lambda_{f,max}$ and/or eigenvector $v_{f,max}$ in 874, the antenna weighting vector w for each mobile in 875, complex conjugation in 876, the signal-to-noise ratio (SNR) in 878, and other similar calculators.

In some embodiments, the BTS generates and/or populates the antenna weighting vector table 842 stored in the memory 840. In such instances, the BTS may include a mapping device 884, which maps the output of the reverse channel detector 822 to the best weighting vector w for the measured channel. Alternatively, rather than map the measured channel directly to the best weighting vector w, the mapping device 884 may first map the measured channel to the nearest function within a class of functions for which the weighting vector w has been pre-computed. After mapping the measured reverse link channel into the nearest function, the weighting vector w pre-computed for this function is applied to the given mobile. In one possible embodiment, the reverse channel detector 822 detects the direction and/or the received signal angular spread of the reverse link signal for the mobile of interest. Based at least in part on the angular spread, the mapping function defines minimum and maximum boundary angles $\theta_{min}$ and $\theta_{max}$ for the mobile of interest. A finite set of minimum and maximum angles is considered in order to limit the types and numbers of cases to be considered.

In this example embodiment, the mapping function 884 maps the measured reverse link angular power profile $\|f(\theta)\|^2$ to the value 1 ("on") in the interval ($\theta_{min}$, $\theta_{max}$) and 0 ("off") outside of this interval. As discussed above, the angular power profile is not substantially non-zero over the entire interval ($\theta_{min}$, $\theta_{max}$), but at the least, ($\theta_{min}$, $\theta_{max}$) are chosen so that $\|f(\theta)\|^2$ is substantially zero outside of this interval.

The boundaries ($\theta_{min}$, $\theta_{max}$) are forwarded to the computation calculator 870 and/or the controller 820 for further processing to determine the optimal or near-optimal weighting vector w. If the weighting antenna weighting vectors are to be pre-calculated, a finite set of intervals ($\theta_1$, $\theta_2$) are selected for pre-calculation and stored in table 842. If the weighting vectors are pre-computed, it is the task of the mapping function 884 to map the angular power profile $\|f(\theta)\|^2$ into a nearest match within the intervals ($\theta_1$, $\theta_2$) contained in table 842. The pre-computed antenna weighting vector corresponding to this interval is then selected and used.

The controller 820 provides control over the BTS 114 and the components of the BTS. One or more buses 886 can be included to allow coupling and communication between the controller and the components of the BTS, as well as communication between the components. Alternatively and/or additionally, direct coupling can be utilized. The controller 820 can be implemented substantially through a processor, microprocessor, computer, other devices providing computational processing and/or combinations thereof.

The memory 840 can include other factors, parameters, processing instructions, programs and other data, information and controls. For example, the memory can include antenna array response vectors $a(\theta)$, dedicated pilot complex gains $d(\theta)$, traffic signal complex gains $q(\theta)$, common pilot complex gains $p(\theta)$, and other factors and data.

The present embodiments provide for enhanced and relatively optimized wireless beam synthesis. This optimization is achieved by attempting to optimize and/or maximize the SNR seen at the mobile. Further, the implementation for better optimizing the SNR utilizes angular power profiles measured from reverse link signals. This relatively optimal beam synthesis can be applied, with somewhat different algorithms, for both common and dedicated pilot systems. A complex weighting is determined that can be applied to an antenna array to minimize the transmit power to achieve a target SNR at the mobile.

Further, these embodiments utilize the determined antenna weighting vector to provide narrowed and/or steered beams directed towards an intended mobile or group of mobiles. The minimized transmit power and narrowed beams further maximize the capacity of a wireless communication system because the transmit beams have been better optimized separately for each mobile or group of mobiles.

In some embodiments, the relatively optimal transmit beam is defined according to an angular power profile of a wireless communication received over a reverse link at the BTS from a mobile. The antenna weighting vector is typically determined without the need for phase information with regards to the reverse link channel. A simplified algorithm is provided that uses only minimal amounts of data to compute and/or determine an enhanced antenna weighting vector. Some embodiments substantially reduce the computational requirements at the BTS by providing look-up tables. The tables allow quick and accurate determination of an antenna weighting vectors that can be applied to the antenna array in the transmission of traffic signals.

While these embodiments have been described by means of specific embodiments and applications thereof, numerous modifications and variations could be made thereto by those skilled in the art without departing from the scope of the invention set forth in the claims.

What is claimed is:

1. A method for use in optimizing a signal-to-noise ratio (SNR) at a wireless device receiving wireless communication, comprising:
    receiving a signal over a wireless channel to produce a received signal;
    determining a first antenna correlation matrix for the received signal;
    factoring the first antenna correlation matrix into a product of a Q matrix and a Hermitian of the Q matrix;
    determining a third matrix from a product of the inverse of the Hermitian of Q matrix, the first antenna correlation matrix and the inverse of the Q matrix;
    determining an eigenvector of the third matrix;
    determining an antenna weighting vector based on the eigenvector;
    applying the antenna weighting vector; and
    transmitting a signal while the antenna weighting is applied.

2. The method of claim 1, further comprising:
    determining an angular power profile of the received signal,
    wherein the angular power profile comprises a receive gain as a function of a receive angle,
    wherein determining the first antenna correlation matrix comprises determining the first antenna correlation matrix using the angular power profile, and
    wherein determining the antenna weighting vector comprises accessing an antenna weighting vector table, and retrieving the antenna weighting vector that is associated with the determined angular power profile.

3. The method of claim 2, further comprising:
    identifying a plurality of boundaries of angular spreads;
    pre-calculating a plurality of antenna weighting vectors according to boundaries of the angular spreads; and
    incorporating the plurality of pre-calculated antenna weighting vectors into the antenna weighting vector table prior to the retrieving of the antenna weighting vector that is associated with the determined angular power profile.

4. The method of claim 1, further comprising:
    determining a pilot weighting vector; and wherein
    determining the antenna weighting vector based on the eigenvector comprises determining the antenna weighting vector such that the antenna weighting vector is based in part on the pilot weighting vector.

5. The method of claim 1, further comprising:
    determining an antenna array response;
    determining a second matrix as the integral of a product of outer products of the array response vector;
    factoring the second matrix to obtain a second Q matrix; and wherein
    determining the antenna weighting vector based on the eigenvector comprises determining the antenna weighting vector such that the antenna weighting vector is based in part on the second Q matrix.

6. A method for use in beam generation for wireless communication, comprising:
    determining an antenna array response;
    determining a first matrix based on the antenna array response;
    factoring the first matrix and obtaining a Q matrix;
    determining an angular power profile of a received wireless reverse link channel signal, wherein the angular power profile comprises a receive gain as a function of a receive angle; and
    determining an antenna weighting vector based on the angular power profile and the Q matrix, wherein the method further comprises:
    determining a second matrix that is proportional to the antenna array response and the angular power profile of the reverse link signal;
    determining a third matrix proportional to the angular power profile of the reverse link signal and the angular power profile;
    calculating a fourth matrix based on the Q matrix and the third matrix; and wherein
    determining the antenna weighting vector comprises the calculating the antenna weighting vector based on the fourth matrix.

7. The method of claim 6, further comprising:
    applying the antenna weighting vector to an antenna array;
    generating a forward link signal through the antenna array with the antenna weighting vector applied.

8. The method of claim 6, further comprising:
    determining a maximum eigenvalue of the fourth matrix;

determining an eigenvector of the fourth matrix associated with the maximum eigenvalue, wherein determining the antenna weighting vector comprises calculating the antenna weighting vector as the product of the inverse of the Q matrix and the eigenvector associated with the maximum eigenvalue.

9. The method of claim 8, wherein determining the third matrix comprises determining an integral of the product of the angular power profile of the reverse link signal and an outer product of the antenna array response.

10. The method of claim 6, further comprising:
determining a plurality of angular boundaries;
pre-calculating a plurality of antenna weighting vectors;
generating a weighting vector table and incorporating the plurality of pre-calculated weighting vectors into the weighting vector table; and wherein
determining the antenna weighting vector comprises determining a direction and angular spread of reception of the reverse link signal and selecting the antenna weighing vector from the plurality of pre-calculated antenna weighting vectors of the weighting vector table that corresponds with the determined direction and angular spread.

11. The method of claim 10, further comprising:
determining a pilot weighting vector; and wherein
pre-calculating the plurality of antenna weighting vectors comprises pre-calculating the plurality of antenna weighting vectors based on the pilot weighting vector.

12. The method of claim 10, further comprising:
determining boundaries of angular spread;
defining continuums between the boundaries; and wherein
pre-calculating the plurality of antenna weighting vectors comprises pre-calculating the plurality of antenna weighting vectors according to the defined continuums.

* * * * *

UNITED STATES PATENT AND TRADEMARK OFFICE
CERTIFICATE OF CORRECTION

PATENT NO. : 7,457,590 B2  Page 1 of 1
APPLICATION NO. : 10/744487
DATED : November 25, 2008
INVENTOR(S) : Colin Frank It is certified that error appears in the above-identified patent and that said Letters Patent is hereby corrected as shown below:

In Column 8, Line 58, delete "$vf(\theta)\|2$" and insert -- $\|f(\theta)\|2$ --, therefor.

In Column 9, Lines 53-54, delete "$f(\theta)f(\theta)=\|f(\theta)\|2$" and insert -- $f(\theta)f(\theta)^*=\|f(\theta)\|2$ --, therefor.

In Column 9, Line 67, delete "$aq(\theta)=d(\theta)$" and insert -- $\alpha q(\theta)=d(\theta)$ --, therefor.

In Column 15, Line 51, delete "Rt" and insert -- $R_t$ --, therefor.

In Column 19, Line 8, delete "Rf" and insert -- $R_f$ --, therefor.

In Column 21, Line 41, delete "0" and insert -- $\theta$ --, therefor.

In Column 22, Line 22, delete "Rf" and insert -- $R_f$ --, therefor.

In Column 24, Line 7, in Claim 2, delete "determing" and insert -- determining --, therefor.

Signed and Sealed this

Fifteenth Day of September, 2009

David J. Kappos
*Director of the United States Patent and Trademark Office*